C. G. HALL.
AUTOMATIC CHANGE SPEED GEARING.
APPLICATION FILED JAN. 13, 1912.
1,054,346.
Patented Feb. 25, 1913.
2 SHEETS—SHEET 1.
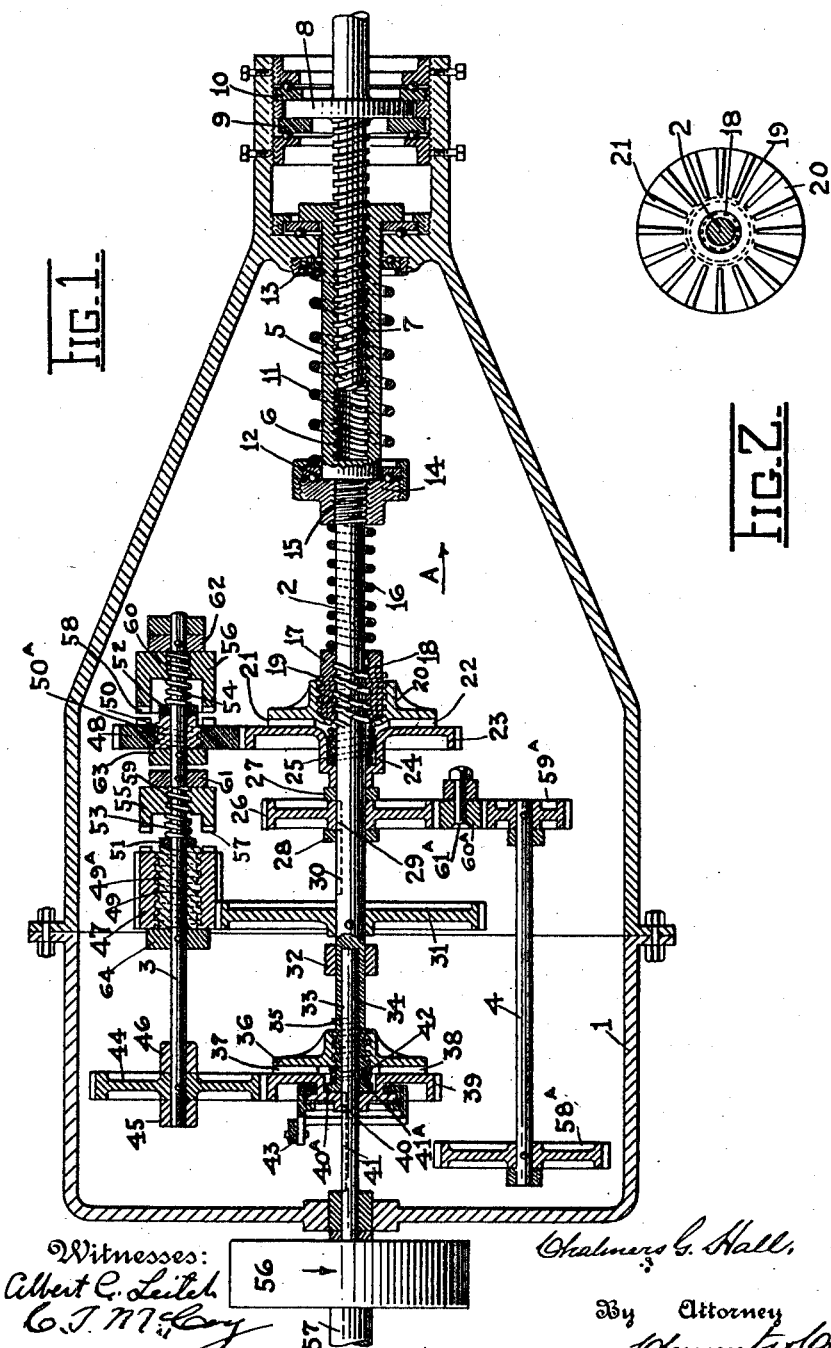

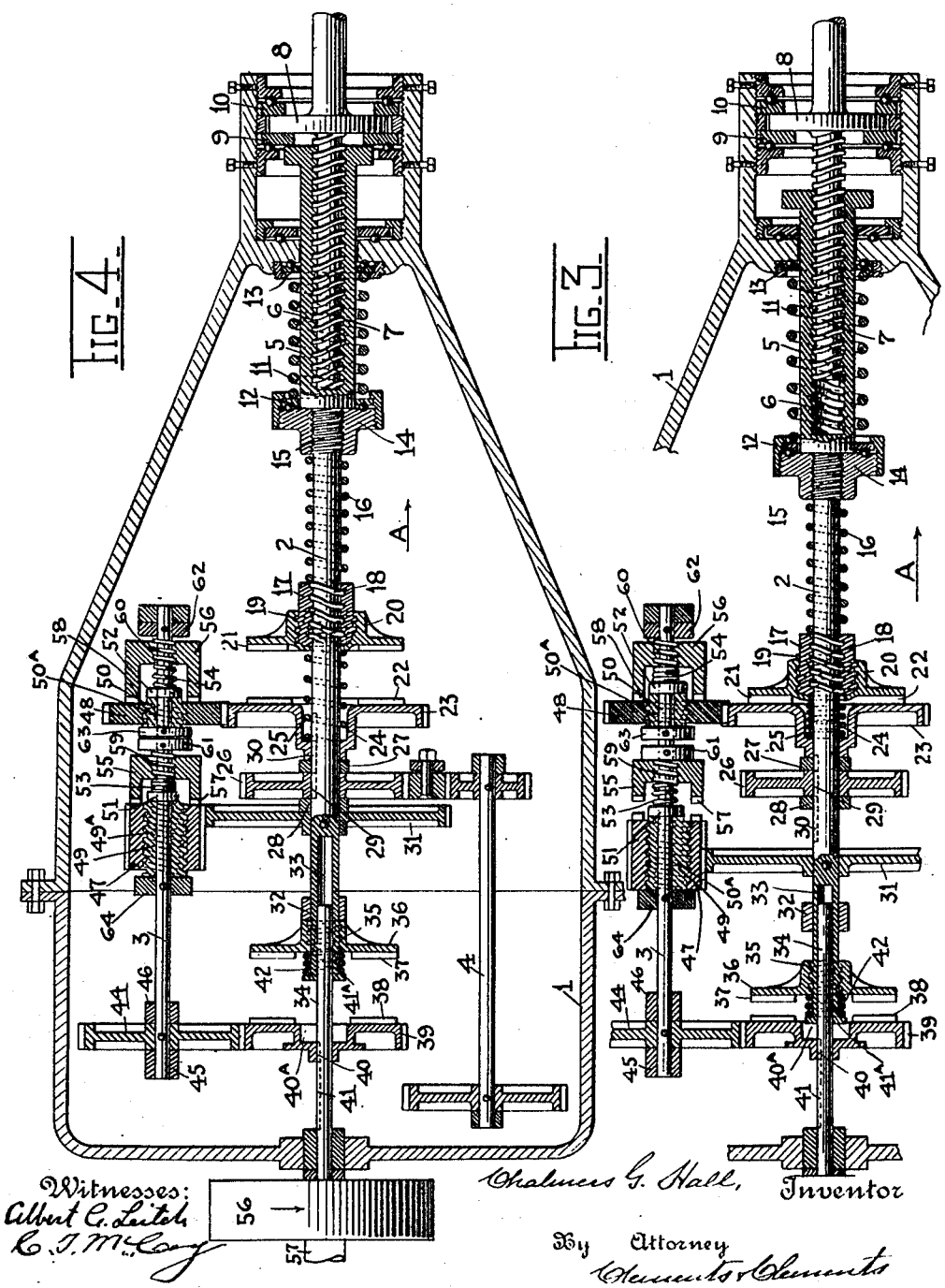

UNITED STATES PATENT OFFICE.

CHALMERS G. HALL, OF FORT LEAVENWORTH, KANSAS.

AUTOMATIC CHANGE-SPEED GEARING.

1,054,346.  Specification of Letters Patent.  Patented Feb. 25, 1913.

Application filed January 13, 1912. Serial No. 671,074.

*To all whom it may concern:*

Be it known that I, CHALMERS G. HALL, a citizen of the United States, residing at Fort Leavenworth, in the county of Leavenworth and State of Kansas, have invented certain new and useful Improvements in Automatic Change-Speed Gearing, of which the following is a specification.

My invention relates to improvements in automatic change speed gearing, and more particularly to a type employing the resistance to movement to effect the required change.

The object of the improvement is to eliminate the usual hand or foot levers generally employed, where the necessity for the changes are based upon "guess work", and to provide automatic mechanical means, the actuation of which depends upon the actual measured resistance to movement.

The improvement consists broadly speaking of a plurality of coöperating gears mounted upon a main, a secondary and a reversing shaft; said main shaft adapted to be translated in a manner tending to effect a change of ratio of the gears, said translation being caused by the resistance to movement acting through a worm screw coupling against the pressure of an adjustable balancing spring.

In the drawings Figure 1 is a longitudinal section showing the device in the high speed or direct drive condition. Fig. 2 is a face view of the drive plate 20. Fig. 3 is a partly broken section showing the elements in position of intermediate gear. Fig. 4 is a longitudinal section showing the device in the low speed condition.

The improvement more specifically described and the parts referred to numerically consists of a casing 1 in which is mounted a main shaft 2, a secondary shaft 3 and a reversing shaft 4, said main shaft having an enlarged portion 5 with an inwardly threaded portion 6 in which is mounted a threaded tail shaft 7 having a thrust collar 8 revolubly mounted between ball bearing thrust faces 9 and 10. A balance spring 11, primary in power is mounted upon enlarged portion 5 of the main shaft, having ball bearing thrust seats 12 and 13 the latter being adjustable by reason of a collar 14 mounted upon a threaded portion 15 of the main shaft 2. A spring 16, secondary in power, having thrust against collars 14 and 17 respectively, collar 17 being revolubly mounted upon threaded portion 18 of main shaft 2, said latter mentioned collar having threaded outer portion 19 upon which is mounted drive plate 20 having radial teeth 21 registering with teeth 22 of the same character on the face of driven gear 23 being loosely and revolubly mounted upon the main shaft 2, said gear having a chamber 24 in which is housed a compression spring 25 (third in power) having thrust against the inner face of driven gear 23 and face of drive plate 20. Gear wheel 26 of the reverse train is mounted fixedly upon shaft 2 with respect to translation and revolution by reason of limiting lugs 27 and 28 secured to casing 1 and an inward feather 29 secured to gear and adapted to admit of a reciprocating motion of main shaft through the same, by reason of a key way 30 in said shaft. Gear 31 pinned to main shaft 2 is the driven gear in the low speed train.

32 is a supporting means for end of main shaft, said means being secured to casing 1.

The main shaft has a counterbored portion 33 adapted to secure an independent revoluble tail shaft 34, said shaft having no motion of translation. Revolubly mounted upon a threaded portion 35 of main shaft 2 is drive plate 36 having radial teeth 37 adapted to mesh with radial teeth 38 of gear 39, said gear 39 being fixedly mounted upon tail-shaft 34 with respect to revolution but adapted to a movement of translation by means of the travel of its locking key 40 in the key way 41 in tail-shaft 34. Gear wheel 39 is provided with a chamber $40^A$ adapted to receive collar $41^A$ of main shaft 2. A compression spring 42 of the same power as spring 25 is mounted upon main shaft between collar $41^A$ and drive plate 36. A hand shifting means 43 is provided for changing gear 39 from the present, that of forward movement, to the reverse train mounted upon shaft 4. Gear 44 is fixedly mounted upon shaft 3 between supports 45 and 46 (one of which is secured to the casing) and meshing with gear 39 so as to convey power through shaft 3 to pinions 47 and 48, said pinions being mounted revolubly in a clockwise direction only on shaft 3. An overrunning arrangement consists of collars 49 and 50 having right hand screw threads 49$^A$ and 50$^A$ on their outer surfaces engaging similar threads on inner surfaces of pinions 47 and 48, said collars 49 and 50 being mounted revolubly on shaft 3; friction washers 51 and 52 mounted loosely upon shaft 3 and operating against faces of collars 49 and 50; coil springs 53 and 54 mounted upon shaft 3 and operating against said friction washers 51 and 52; drive plates 55 and 56 with radial face teeth 57 and 58 engaging under certain conditions with similar radial teeth on pinions 47 and 48, said drive plates being mounted upon left hand screw seats 59 and 60 on shaft 3, said arrangement permitting of a limited motion of rotation and translation, coil springs 53 and 54 above referred to also serving to keep drive plates, when unlocked from their respective pinions in the extreme out of engagement position. Fixed collars 61 and 62, 63 and 64 limit the backward motion of drive plates 55 and 56 and pinions 47 and 48 respectively. Gears 58$^A$ and 59$^A$ and idler 60$^A$ mounted upon shaft 4 and stud 61$^A$ form the reversing system.

The operation of the device is as follows: In Fig. 1 which is the high speed or direct drive condition we will assume the motive power to be driving the main shaft in the direction indicated by the arrow on face of clutch 56, or counter-clockwise, the effect is to cause all gears to be in motion but the line of power is transmitted directly through the main shaft 2 and tail shaft 7 to the point of power delivery and in the case of an automobile through the differential to the wheels, which in this case, for the sake of explanation we will assume give a resistance of five hundred inch pounds (the designed safe working load for the motor directly driven). The resistance to compression of the balancing spring 11 is sufficient to prevent the quick threaded portion of the tail shaft 7 from drawing the main shaft 2 in the direction indicated by the arrow A, in this way allowing the drive plate 36 to remain in locked relation with drive gear 39; in the high or direct drive condition gears 47 and 48 "run over" with respect to shaft 3 the cause of which will be explained later, but should the resistance to torque increase by reason of a heavier load than that designed for direct drive, the tendency is for shaft 7 by reason of the action of the threaded portion of same in conjunction with the inwardly threaded portion 6 of the main shaft to cause a motion of translation in said main shaft in a direction indicated by arrow A and against the compression of prime compression spring 11. Drive plate 36 is now withdrawn from locked relation with gear 39. Gear 48 of the secondary train is brought into action with gear 23 by virtue of the unlocking of drive plate 36 and gear 39 thus causing a momentary "slack" in the speed of the main shaft, by reason of its disconnection from the motive power, thus causing pinion 48 to correspondingly slacken in speed or to revolve counter-clockwise with respect to shaft 3 and collar 50 which collar is caused to revolve with shaft 3 by the co-operation of friction washer 52, spring 54 and its thrust against outer wall of drive plate 56. Pinion 48 now travels toward drive plate 56 by reason of the counter clockwise movement on a right hand screw seat until the near edges of the radial face teeth of the pinion and the drive plate touch, further movement in the same direction imparting a counter clockwise movement to the drive plate 56 (with respect to its shaft) mounted on the left hand thread 60 with the obvious result of bringing the plate and the pinion together and seating the registering radial teeth, thus effecting the locked relation as shown in Fig. 3. A greater space is provided between pinion 47 and its drive plate than that of pinion 48 and its plate to allow the latter to assume locked relations first. Pinion 47 is now a driven gear, revolving faster than shaft 3 and is consequently kept out of engaged position with respect to drive plate 55 as shown in Fig. 3. The drive is now from clutch 56 (shown in Figs. 1 and 4) to shaft 34 gears 39 to 44, shaft 3 to gears 48 and 23 through drive plate 20 to main shaft to point of power delivery. Assuming the load to have further increased, the several elements take the position shown in Fig. 4, that of low gear. By a further actuation of the mechanism already described the drive is now through shaft 34 to gears 39 and 44 to shaft 3, gears 47 and 31 and on through the main shaft to point of delivery. In this condition, that of low gear, pinion 48 is still driving gear 23, but by reason of clutch 20 having been withdrawn therefrom it is revolving loosely upon main shaft. The drive plates 20, 36, 55 and 56 have a slight motion of rotation and translation upon their respective seatings which by reason of their compression springs are kept in the backward position with respect to their collars when not locked to their corresponding gears. But when the motion of translation of the main shaft 2 has been sufficient to bring either of the locking faces to within touching distance of their respective gears 23, 39, 47 or 48, the counter-clockwise movement of the latter mentioned gears causes the faces to rotate independently of the main shaft 2 and of the seating collars 17, 49 and 50, thus causing an independent movement of translation of the respective faces (by reason of the threaded portions upon which they are mounted) in a direction tending to completely lock them with their corresponding gears.

In the presentation of my application I have simply shown an operative form embodying the elements of my improvement. I will of course claim the right to make such changes in detail as may suggest themselves in the manufacture that do not depart from the spirit of my claims.

Having thus described my improvement I claim:

1. In a device of the character described, the combination of a casing, a plurality of coöperating gears, a main, a secondary and a reversing shaft, all revolubly mounted in the said casing and adapted to carry the aforementioned gears, the said main shaft having an automatic longitudinal reciprocating motion, said motion tending to effect a change in the line of drive through the said gears as described, and means for employing the resistance to movement to effect the said change, and a balancing spring for opposing the said means.

2. In a device of the character described, the combination of a casing, a plurality of coöperating gears, a main, a secondary and a reversing shaft all revolubly mounted in the said casing and adapted to carry the aforementioned gears, the said shaft having an enlarged end portion internally threaded, the said main shaft having an automatic longitudinal reciprocating motion, said motion tending to effect a change in the line of drive through the said gears, all as described, and an externally threaded tail shaft being fixedly mounted with respect to longitudinal movement and adapted to engage the internal threaded portion of the main shaft in a manner tending to effect the above mentioned change in the line of drive through the said gears mounted upon the said shafts, and a compression spring for opposing the said longitudinal reciprocating motion.

3. In a device of the character described, the combination of a casing and a plurality of coöperating gears, a main shaft, a secondary shaft, and a reversing shaft, all revolubly mounted in the said casing and adapted to carry the aforementioned gears, the said main shaft having an automatic longitudinal reciprocating motion, said motion tending to effect a change in the line of drive through the said gears, all as described, the said main shaft having an enlarged end portion internally threaded and a further enlarged collar portion, ball bearing revoluble limiting means arranged within the casing at the maximum points of longitudinal movement of the enlarged collar portion of the main shaft and a compression spring mounted upon the said enlarged portion of the main shaft with a tendency to effect an arrangement of the coöperating gears designed to give a direct drive.

4. In a device of the character described, the combination of a casing, a main, a secondary and a reversing shaft, a plurality of coöperating gears mounted thereon, the said shafts being revolubly mounted within the said casing, a screw threaded jointing means in the said main shaft admitting of a limited longitudinal adjustment and a compression balancing spring mounted upon an enlarged portion of the said shaft, and adjustable ball bearing thrust members adapted to regulate the amount of resistance in the said spring to longitudinal adjustment of the said jointing means on the main shaft, self locking drive plates mounted upon the main and the secondary shafts having radial teeth, and gear wheels also having similar radial teeth adapted by reason of the longitudinally reciprocating and revoluble main shaft to be brought into locked relation with each other and coöperate with other gears to effect certain changes in the line of drive through the said gears, as described, and compression springs for keeping the drive plates in a rearward position with relation to their respective connecting gears when in the unlocked position.

5. In a device of the character described, the combination of a casing, a main, a secondary and a reversing shaft, a plurality of coöperating gears mounted thereon, the said shafts being revolubly mounted within the said casing, the said main shaft being provided with automatic means tending to effect a longitudinal reciprocating motion, the secondary shaft being mounted above, and the reversing shaft being mounted below, a tail shaft loosely and revolubly mounted in a smooth counterbore in the main shaft admitting of the said reciprocating motion of the said main shaft, a tail shaft, a driven gear slidably mounted upon said tail shaft, a hand lever connected therewith for alternately connecting the same with the reverse train or the ahead system from the neutral or the out of gear position, the said gear further having a circular chamber and peripheral and radial face teeth; an overhead gear meshing with the former teeth and supplying power to the counter shaft to which it is secured, pinions having peripheral and radial face teeth and threaded inner bearing surfaces, friction held collars having threaded outer surfaces and smooth inner surfaces, the latter mentioned pinions being mounted upon the threaded surfaces of the friction held collars and the whole being mounted upon the latter mentioned counter shaft, said counter shaft having threaded portions thereon, drive plates having threaded inner surfaces mounted thereon, the said drive plates further having radial face teeth coöperating under certain conditions with similar teeth, above referred to, on the latter mentioned pinions, compression springs disposed between the said friction held collars and the said drive plates, all as and for the purpose set forth.

In testimony whereof I affix my signature in presence of two witnesses.

CHALMERS G. HALL.

Witnesses:
 OTTO E. KLAUS,
 HENRY SHINDLER.